(12) United States Patent
Lin

(10) Patent No.: US 7,442,933 B2
(45) Date of Patent: Oct. 28, 2008

(54) BOLOMETER HAVING AN AMORPHOUS TITANIUM OXIDE LAYER WITH HIGH RESISTANCE STABILITY

(76) Inventor: Alice L. Lin, 12320 Baja Panorama, North Tustin, CA (US) 92705

( * ) Notice: Subject to any disclaimer, the term of this patent is extended or adjusted under 35 U.S.C. 154(b) by 128 days.

(21) Appl. No.: 11/345,968

(22) Filed: Feb. 2, 2006

(65) Prior Publication Data

US 2006/0255274 A1    Nov. 16, 2006

Related U.S. Application Data

(60) Provisional application No. 60/649,523, filed on Feb. 3, 2005.

(51) Int. Cl.
*G01J 5/00* (2006.01)
(52) U.S. Cl. .................................. 250/338.1
(58) Field of Classification Search ............... 250/338.1
See application file for complete search history.

(56) References Cited

U.S. PATENT DOCUMENTS

| | | | |
|---|---|---|---|
| 3,619,614 A | 11/1971 | Yamaka | |
| 5,010,251 A | 4/1991 | Grinberg | |
| 5,584,117 A | 12/1996 | Lee | |
| 5,629,521 A | 5/1997 | Leet | |
| 5,698,852 A | 12/1997 | Tanaka | |
| 5,713,763 A | 2/1998 | Schwarz | |
| 5,801,383 A * | 9/1998 | Wada et al. ................. | 250/332 |
| 5,962,854 A | 10/1999 | Endo | |
| RE36,706 E | 5/2000 | Cole | |
| 6,144,030 A | 11/2000 | Ray | |
| 6,198,099 B1 | 3/2001 | Kim | |
| 6,448,557 B2 | 9/2002 | Oda | |
| 6,468,402 B1 * | 10/2002 | Vanderstraeten ....... | 204/192.15 |
| 6,489,613 B1 | 12/2002 | Mori | |
| 6,552,344 B1 | 4/2003 | Sone | |
| 6,690,014 B1 | 2/2004 | Gooch | |
| 6,717,147 B2 | 4/2004 | Oda | |
| 6,777,681 B1 | 8/2004 | Schimert | |
| 6,787,387 B2 | 9/2004 | Ikushima | |
| 6,806,470 B2 | 10/2004 | Iida | |
| 2001/0010360 A1 | 8/2001 | Oda | |
| 2002/0005485 A1 | 1/2002 | Hashimoto | |
| 2002/0040967 A1 | 4/2002 | Oda | |
| 2002/1075284 | 11/2002 | Vilain | |
| 2003/0025078 A1 | 2/2003 | Yamaguchi | |
| 2003/0062480 A1 | 4/2003 | Kanzaki | |
| 2003/0141453 A1 | 7/2003 | Reed | |
| 2003/0168598 A1 | 9/2003 | Oda | |
| 2003/0183921 A1 | 10/2003 | Komobuchi | |
| 2003/0209668 A1 | 11/2003 | Tohyama | |
| 2004/0089807 A1 | 5/2004 | Wada | |
| 2004/0129882 A1 | 7/2004 | Mashio et. al. | |
| 2004/0173751 A1 | 9/2004 | Kimobuchi | |
| 2004/0207288 A1 | 10/2004 | Funakubo | |
| 2005/0017276 A1 | 1/2005 | Ikushima | |

\* cited by examiner

*Primary Examiner*—David P. Porta
*Assistant Examiner*—Jessica L Eley
(74) *Attorney, Agent, or Firm*—Sonnenschein Nath & Rosenthal LLP

(57) ABSTRACT

A bolometer is provided for use in an infrared imager. The bolometer comprises a substrate and a TiOx layer formed over the substrate. The TiOx layer has a resistance responsive to temperature. The x value of the TiOx layer is in the range of 1.68 to 1.95.

1 Claim, 19 Drawing Sheets

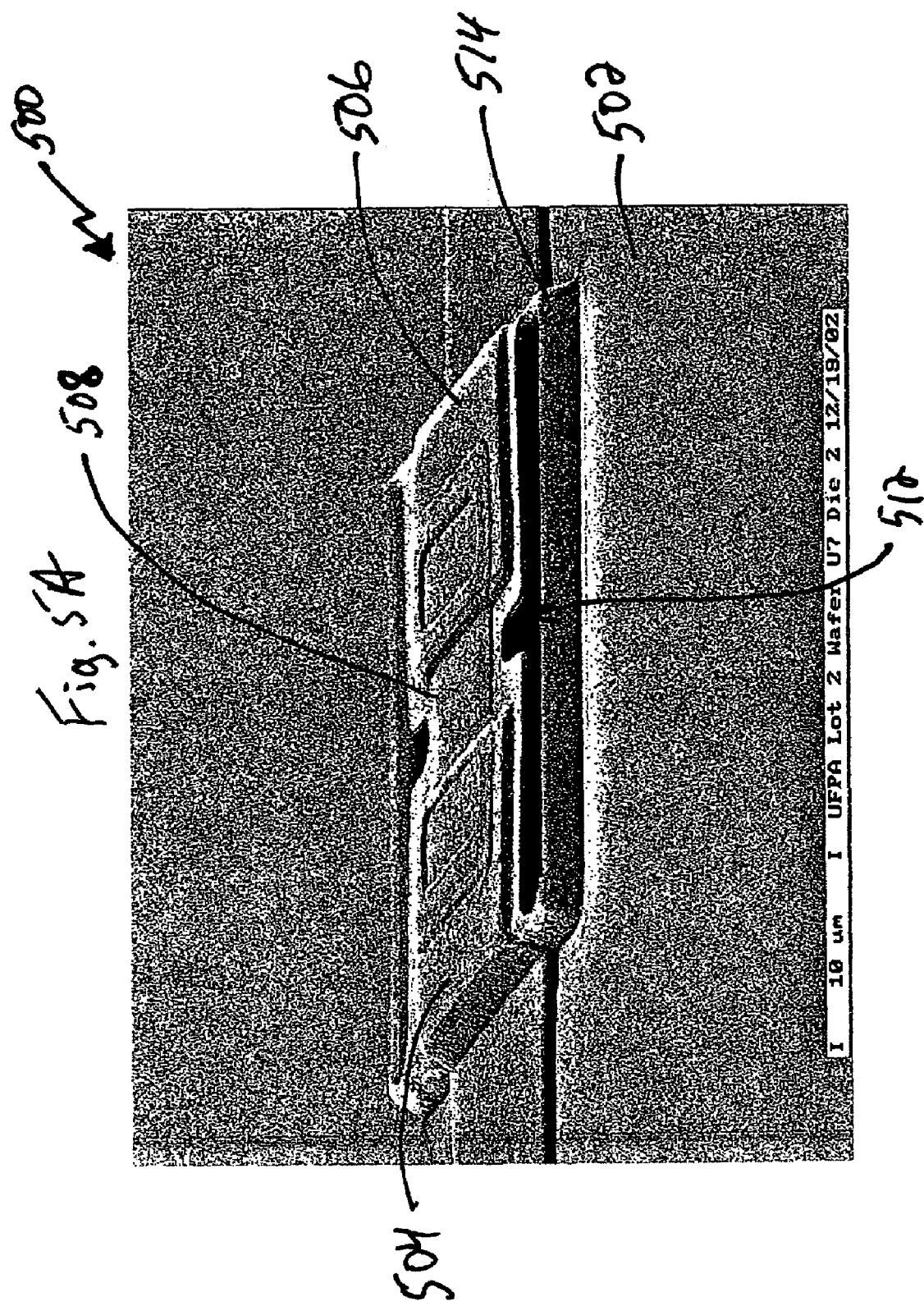

BOLOMETER HAVING AN AMORPHOUS TITANIUM OXIDE LAYER WITH HIGH RESISTANCE STABILITY

CROSS-REFERENCE TO RELATED APPLICATIONS

This application claims the benefit of the filing date of U.S. Provisional Application No. 60/649,523, entitled "Thin Film TiOx Resistors For Bolometric Applications," filed on Feb. 3, 2005, which is incorporated herein by reference to the extent allowable by law.

FIELD OF THE INVENTION

The present invention relates to a bolometer for use in an uncooled infrared detector, and, more particularly, to a bolometer having an amorphous TiOx layer where the ratio "x" is in the range of 1.68 to 1.95.

BACKGROUND OF THE INVENTION

There is a growing interest in uncooled, infrared ("IR") imaging for both military and commercial applications such as night vision and heat sensing for fire alarms. Modern silicon micromachining, combined with advances in read-out circuit design/fabrication and digital signal processing, have resulted in uncooled, IR focal plane arrays becoming commonplace in many imaging applications.

Resistive bolometers, which are well known in the art, are particularly attractive for uncooled thermal detector applications, such as an uncooled focal plane array (UFPA), because they have relatively high responsivity and can be fabricated with relatively greater ease than other types of detectors, such as thermopile detectors and pyroelectic detectors.

In a focal plane array device, it is desired that the bolometer material fulfills the following criteria: 1) adequate resistivity to match the read-out electronics; 2) good ohmic contact with low contact resistance between the bolometer and the leg metal; 3) high temperature coefficient of resistance (TCR), preferably exceeding 2%; 4) low 1/f-noise; 5) ability to be deposited using a technique compatible with existing microbolometer fabrication processes; and 6) stable electrical properties.

Conventional uncooled bolometers include detectors based on vanadium oxide VOx, amorphous silicon Si and semiconducting YBCO compound. These materials may fulfill most of the above criteria, but typically do not have stable electrical properties to satisfy the sixth criterion.

Currently, VOx is the microbolometer material most commonly used in an uncooled IR camera because of its high Temperature Coefficient of Resistance (TCR), adequate resistance and low 1/f-noise values. However, the resistance of the VOx bolometers is unstable under certain operating conditions. For example, exposing microbolometers (pixels) manufactured from VOx to Joule heating or infrared heating results in the resistance of the microbolometers varying with a long decay time to equilibrium and, for certain conditions, a permanent residual resistance change. It causes pixel-to-pixel variations in an UFPA. Depending upon the extent of the resistance aging induced instability, the instability may be automatically electronically compensated to maintain high performance of the VOx UFPAs. In many cases, however, resistance aging effects that result from the infrared heating associated with the operational condition of pixel heating cannot be automatically compensated. These aging or "memory" effects are seen in thermal images generated by cameras, which is undesirable. In addition, resistance instability of VOx often leads to a loss of yield and an increase in the cost of VOx UFPA production.

U.S. Pat. No. 5,698,852 discloses a bolometer for uncooled IR detectors in which the bolometer is made of pure titanium or a titanium alloy (e.g., titanium combined with another metal) in order to have a specific resistance near 47 $\mu\Omega$-cm and a resistance change (or TCR) of 0.3% for a lower 1/f noise ratio than conventional VOx bolometers. However, using a bolometer made of pure titanium or a titanium alloy typically requires the resulting resistor to be very long and serpentine in shape to have a resistance compatible with readout electronics wiring while maintaining a TCR of 0.3% in comparison to other conventional bolometers (e.g., a VOx bolometer), resulting in the titanium bolometer occupying a significant amount of space on the substrate of an uncooled focal point array for an IR detector.

A few patent references (US Patent App. No. 2003/0209668 and U.S. Pat. Nos. 6,198,099; 6,144,030; Re. 36,706; 5,629,521, 5,584,117, and 5,010,251) have identified titanium oxide (TiOx) as an alternative to VOx as the resistive material layer for a bolometer. However, each of these references, fails to disclose a structure type (e.g., crystalline, polycrystalline, or amorphous) or composition for the titanium oxide layer, each of which can significantly impact properties of the resulting bolometer. Moreover, several of these references (US Patent App. No. 2003/0209668 and U.S. Pat. Nos. 6,198,099; 6,144,030; Re.36,706) and one other reference (U.S. Pat. No. 6,489,613) that mentions Ti2O3 as a potential composition of a bolometric material, each teach using a VOx structure and composition as the preferred material for a bolometer despite the aging or "memory" effect problems associated with the resistance instability of VOx.

Therefore, there is a need for a resistor material that overcomes the problems noted above and others previously experienced for bolometers. In particular, there is a need for a bolometer resistor material that has a high TCR, low 1/f-noise, provides for higher yield UFPA production at lower cost, and has substantially stable resistance that avoids the above identified memory effect problem.

SUMMARY OF THE INVENTION

In accordance with infrared imagers and thermal sensors consistent with the present invention, a bolometer is provided that has substantially high resistance stability and substantially low 1/f noise. The bolometer comprises a substrate and a TiOx layer formed over the substrate, where the x value of the TiOx layer is in the range of 1.68 to 1.95. The TiOx layer after formation over the substrate may be heated at a predetermined temperature for a predetermined period such that the TiOx layer has a substantially constant resistance stability.

Other systems, methods, features, and advantages of the present invention will be or will become apparent to one with skill in the art upon examination of the following figures and detailed description. It is intended that all such additional systems, methods, features, and advantages be included within this description, be within the scope of the invention, and be protected by the accompanying claims.

BRIEF DESCRIPTION OF THE DRAWINGS

The accompanying drawings, which are incorporated in and constitute a part of this specification, illustrate an implementation of the present invention and, together with the description, serve to explain the advantages and principles of the invention. In the drawings:

FIG. 5A depicts a layout of a two-terminal released bolometer formed in accordance with the present invention;

DETAILED DESCRIPTION OF THE INVENTION

Reference will now be made in detail to an implementation in accordance with methods, systems, and products consistent with the present invention as illustrated in the accompanying drawings.

In accordance with infrared imagers and thermal sensors consistent with the present invention, a bolometer comprising a TiOx layer formed to have substantially high resistance stability and substantially low 1/f noise is provided, where x is in the range of 1.68 to 1.95.

In addressing the problems with bolometers discussed above, in particular the memory effect problem, the inventor experimented with different structures and compositions of a TiOx as a resistive layer for a bolometer. The inventor identified $TiO_2$ as having a wide bandgap semiconductor (3.03 eV for rutile form of TiO2 and 3.18 eV for anatase form of $TiO_2$). $TiO_2$ is also mechanically hard, chemically resistant, transparent in the visible and near IR range, and has a high refractive index. Such properties of $TiO_2$ make this material suitable for many applications in solar cells, photocatalysis, and anti-reflecting coatings. The wide bandgap of $TiO_2$ provides for an extremely high electrical resistivity. The resistivity values at room temperature for undoped $TiO_2$, Nb (0.35 at. %) doped $TiO_2$, and Fe (1 at. %) doped $TiO_2$ films are $1\times10^8$, $1.2\times10^7$, and $5\times10^8$ $\Omega$-cm, respectively. However, materials with such high resistivity values are unsuitable for implementing a bolometer because the resulting bolometer would be incompatible with the read-out circuitry for an associated pixel of an imager.

Figure 1:
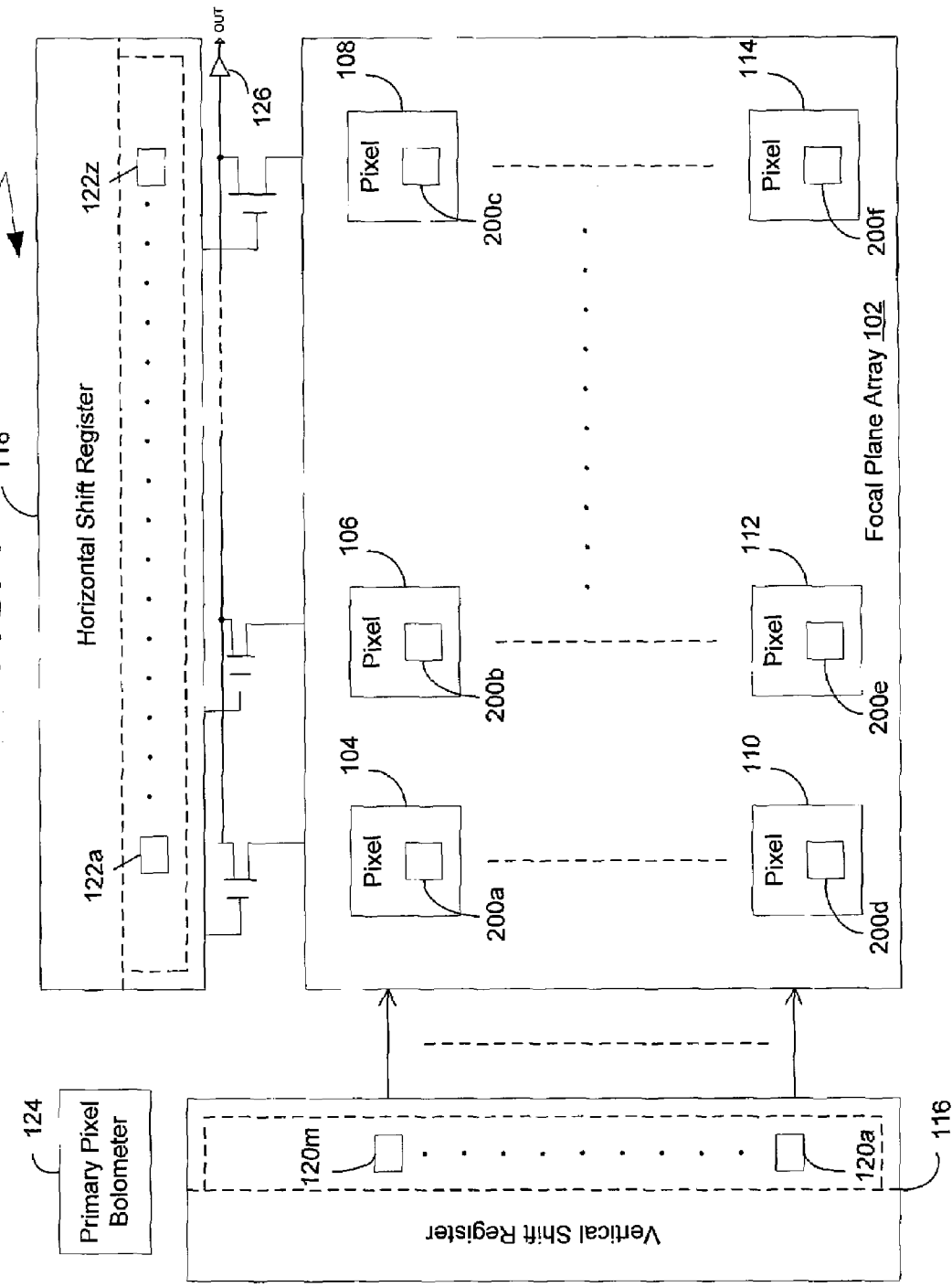
FIG. 1 is a block diagram of an exemplary infrared imager having a plurality of pixels, each pixel having a respective bolometer consistent with the present invention.
Figure 2:
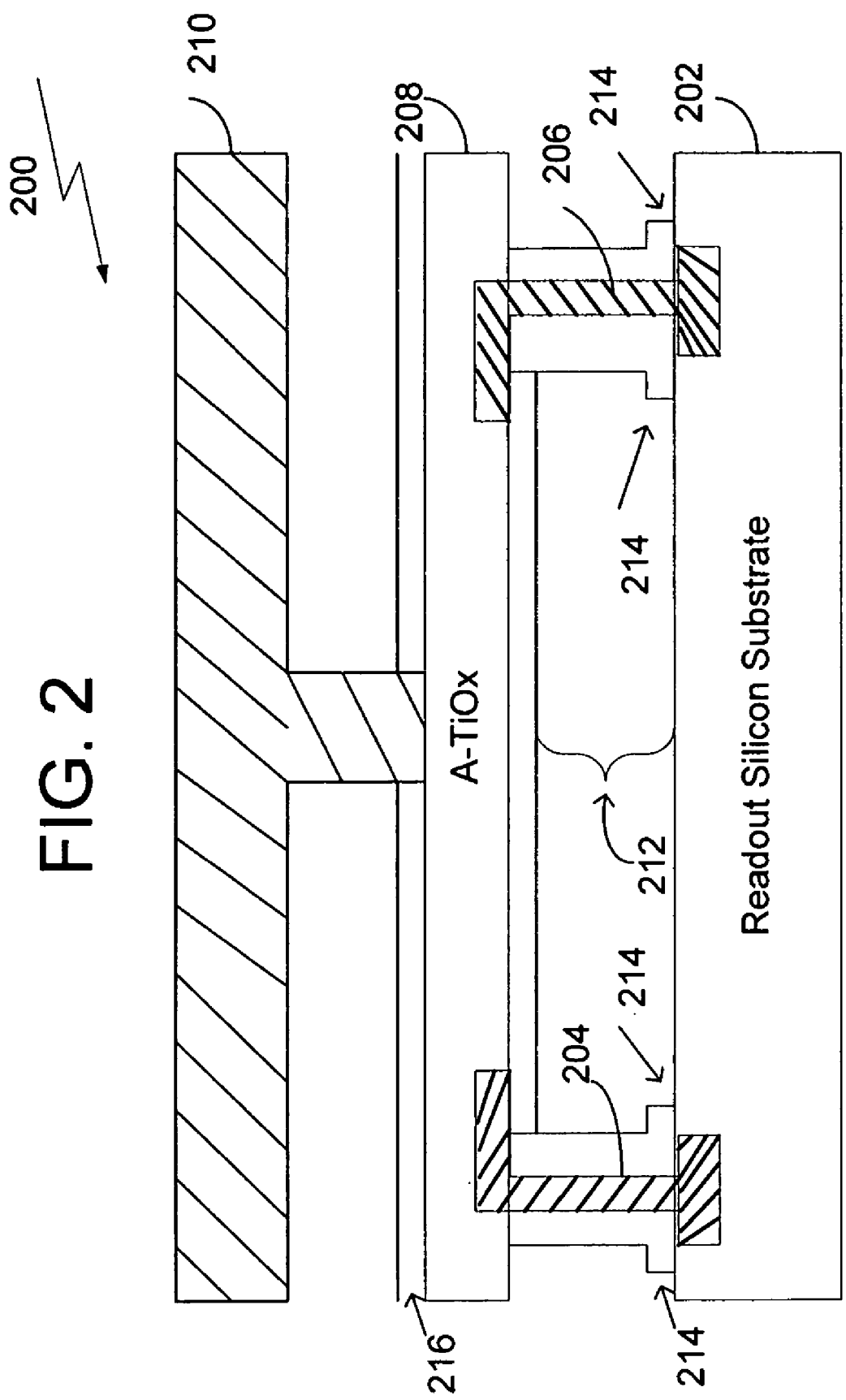
FIG. 2 is a front cross sectional view of an exemplary structure for each pixel bolometer in FIG. 1, where each pixel bolometer has a TiOx layer formed in accordance with the present invention.

FIG. 1 is a block diagram of an exemplary infrared imager 100 having a focal plane array 102. The focal plane array includes a plurality of pixels 104, 106, 108, 110, 112 and 114 each of which includes a bolometer structure 200a-200n consistent with the present invention. Each pixel 104, 106, 108, 110, 112 and 114 includes a thermal sensor portion or bolometer 200 as shown in FIG. 2. In the implementation shown in FIG. 1, the infrared imager 100 also includes a vertical shift register 116 operatively configured to select a row of pixels (e.g., pixels 104, 106, and 108) and a horizontal shift register 118 operatively configured to shift the selected row of pixels to an amplifier 126 for output to an image processor (not shown in figures).

The vertical shift register 116 may include a plurality of heat sink or reference bolometers 120a-120m. Each heat sink or reference bolometers 120a-120m is adapted to be selectively connected to each bolometer in a respective row of pixels (e.g., reference bolometer 120m is selectively connected to each bolometer 200a-200c in the row of pixels 104, 106, and 108). The horizontal shift register 118 may also may include a plurality of heat sink or reference bolometers 122a-122z. Each heat sink or reference bolometers 122a-122z is adapted to be selectively connected to each bolometer in a respective column of pixels (e.g., reference bolometer 120z is selectively connected to each bolometer 200c-200f in the column of pixels 108 and 114). The infrared imager may also include a primary pixel bolometer 124. The structure of each heat sink or reference bolometer 120a-120m and 122a-122z and the primary pixel bolometer 124 corresponds to the structure of the pixel bolometers 200a-200f as discussed below. In addition, the heat sink or reference bolometers 120a-120m and 122a-122z and the primary pixel bolometer 124 are each covered to provide a respective dark signal reference for each pixel bolometer 200a-200n during readout.

Figure 8:
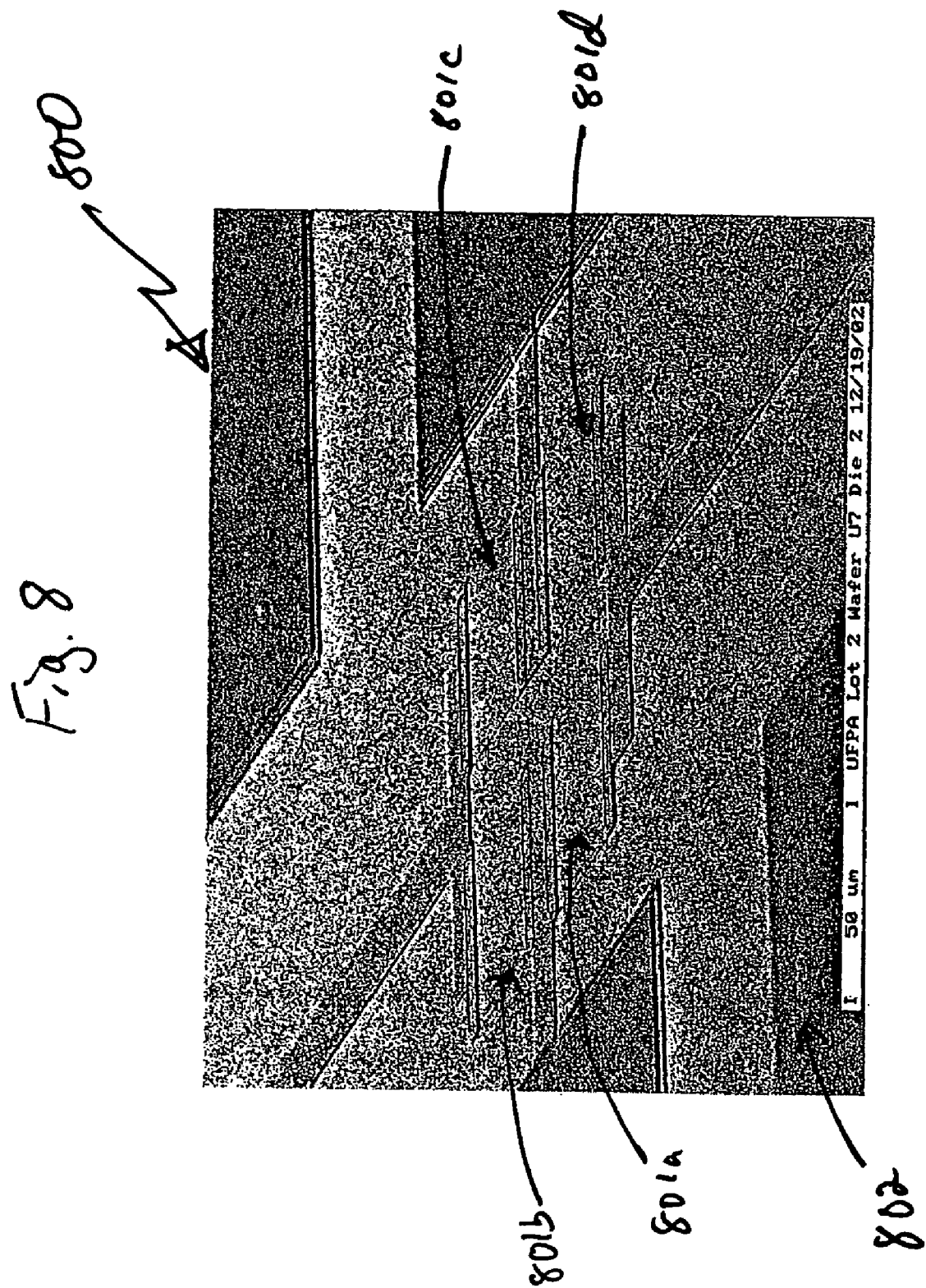
FIG. 8 depicts a layout of a four-terminal Wheatstone bridge having four heat-sink bolometers formed in accordance with the present invention.
Figure 9:
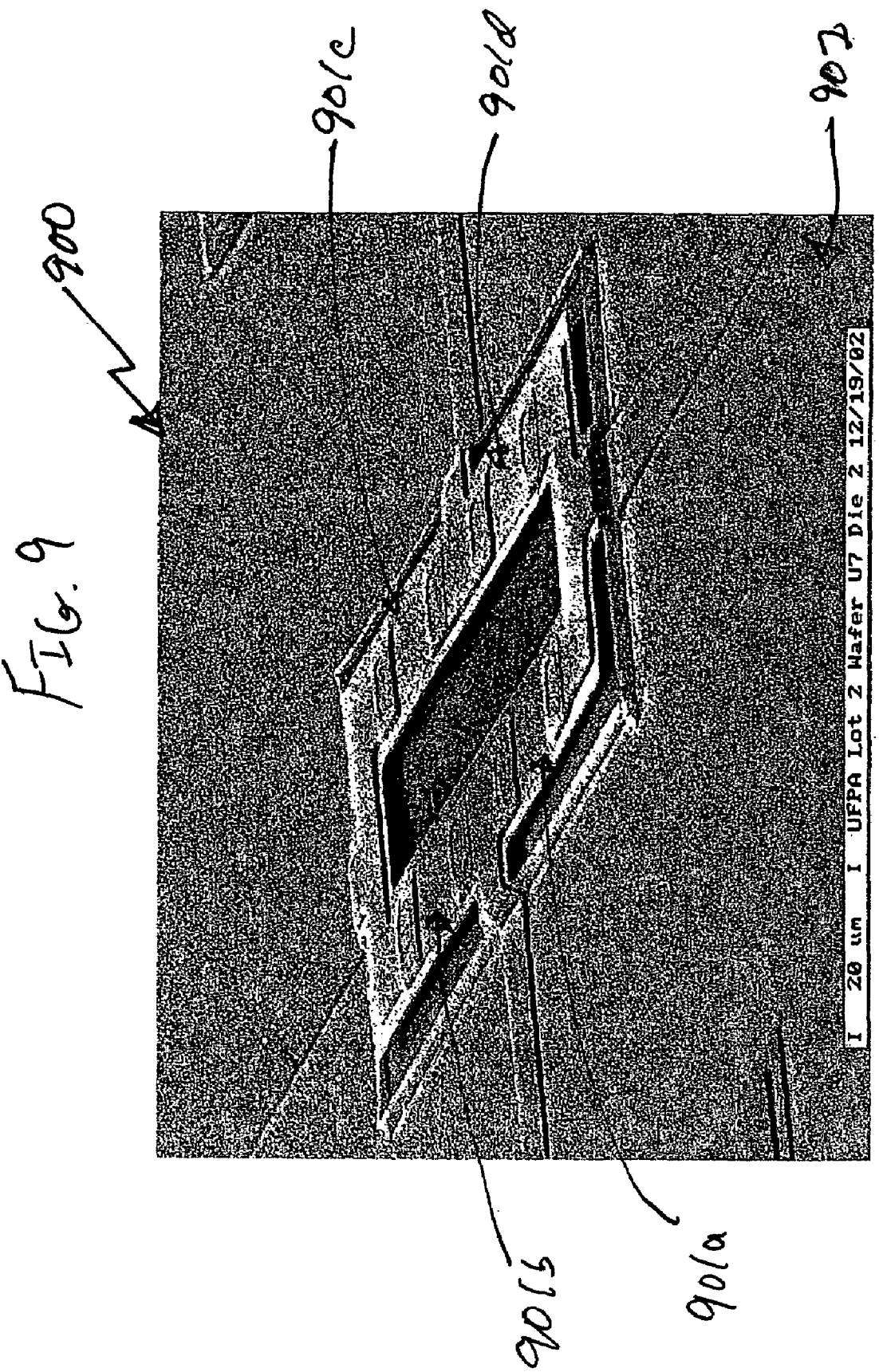
FIG. 9 depicts a layout of another four-terminal Wheatstone bridge having four released bolometers formed in accordance with the present invention.

In one implementation, when a respective pixel 104, 106, 108, 110, 112, and 114 is readout via the vertical shift register 116 and the horizontal shift register 118, the bolometer of the pixel (e.g., bolometer 200a of pixel 104) is selectively connected to the heat sink or reference bolometer of the vertical shift register 118 for the corresponding pixel row (e.g., reference bolometer 120m), to the heat sink or reference bolometer of the horizontal shift register for the corresponding pixel column (e.g., heat sink bolometer 122a), and to the primary pixel bolometer in a known Wheatstone bridge configuration (e.g. See corresponding Wheatstone bridge structures 800 and 900 in FIGS. 8 and 9). By selectively connecting each pixel bolometer 200a-200n in a Wheatstone bridge configuration with a dark signal heat sink or reference bolometer 120a-120m and 122a-122z, each pixel bolometer 200a-200n may be readout with substantially high sensitivity relative to a dark signal.

FIG. 2 is a front cross sectional view of an exemplary bolometer structure 200 consistent with the structure of each bolometer 200a-200f of the infrared imager 100. The bolometer 200 includes a readout silicon substrate 202, a pair of thermal resistive metal legs 204 and 206, and an amorphous TiOx layer 208 (where x is in the range of 1.68 to 1.95) formed on the legs 204 and 206 to be suspended (or released) over the silicon substrate 202. In one fabrication process implementation, a polyimide layer (or other easily dissolvable material) is first formed over the substrate 202. The polyimide layer is masked and etched to leave a pattern of polyimide portions. The polyimide portions are not shown in the figures but each portion corresponds to a respective gap 212 between the TiOx layer 208 and the substrate 202 as depicted in FIG. 2. After forming the legs 204 and 206, the amorphous TiOx layer 208 is then deposited over each polyimide portion using a reactive ion-beam deposition technique such that each $TiO_x$ layer 208 has good ohmic contact and low contact resistance with the legs 204 and 206 of the respective bolometer 200a-200f. Oxygen partial pressure is used to control the electrical resistivity of the TiOx layer 208 for each bolometer 200a-200f. After forming the legs 204 and 206 and the TiOx layer 208, the portions of the polyimide are dissolved and removed to generate the gap 212 and suspend or release the TiOx layer 208 over the substrate 202. Readout circuitry (not shown in FIG. 2) for each pixel 104, 106, 108, 110, 112, or 114 is operatively connected to the legs 204 and 208 of the respective pixel bolometer 200a-200f and is formed on the same substrate 202 in proximity to the respective bolometer 200a-200f.

Reference bolometers 122a-122m are formed to correspond to the pixel bolometers 200a-200f. Heat sink bolometers 122a-122z are also formed to correspond to the pixel bolometers 200a-200f except that there is no gap 212 formed between the TiOx layer 208 and the substrate 202 for each heat sink bolometer 122a-122z such that the TiOx layer 208 is formed directly on the substrate 202 or over the first silicon oxide layer 214 deposited on the substrate 202.

In one implementation, each bolometer 200a-200f may have a silicon oxide or silicon nitride umbrella 210 formed over the TiOx layer 208 to function as an IR absorber for the bolometer 200a-200n. In addition, each bolometer 200a-200n may also include a silicon oxide layer 214 deposited over the substrate 202 after formation of the polyimide portions and before formation of the TiOx layer 208. Another silicon oxide layer 216 may be deposited over the TiOx layer 208. The silicon oxide layers 214 and 216 may function as an insulator for the metal legs 204 and 206 and as an additional IR absorber for the bolometer 200a-200n.

After formation of the $TiO_x$ layer 208 having an x value in the range of 1.68 to 1.95, the respective bolometer 200a-200n (or the focal plane array 102) is heated or annealed at a predetermined temperature for a predetermined time, such as 200° C. or higher for 1 hour or more or preferably between 300° C. to 420° C. for 5 minutes to 20 minutes, so that the respective bolometer 200a-200f has a substantially high resistance stability as discussed in further detail below.

The inventor discovered that a bolometer 200a-200f comprising an amorphous $TiO_x$ layer 208 having a concentration value of x in the range of 1.68 to 1.95 formed in accordance with the present invention has a substantially higher resistance stability than bolometers made with a VOx layer or other TiOx layer structures (e.g., crystalline) or TiOx layers with different x value concentrations. Bolometers 200a-200f having a TiOx layer 208 produced in accordance with the present invention were measured for TCR values, contact resistance, and excess noise (e.g., 1/f noise) as discussed below.

Amorphous $TiO_x$ layers or films 208 formed in accordance with the present invention to have various x values concentrations were measured for sheet resistance and TCR values. TCR values of each $TiO_x$ layer 208 may be computed from a determination of the temperature dependent sheet resistance ($R_{st}$) of the respective $TiO_x$ layer 208. In one implementation, a number (25 or more) of amorphous $TiO_x$ layers 208 having the same thickness but with a respective different sheet resistance from 9K ohm/squ to 700K ohm/squ at room temperature were deposited on a respective $SiO_2$-coated Si substrate consistent with the bolometer structure 200 shown in FIG. 2. The different resistance of each $TiO_x$ layer 208 was varied by varying the oxide concentration (or x value) of the respective $TiO_x$ layer 208. The measurement of $R_{st}$ may be performed, for example, using a Signatone four-point probe semi-automatic station or other technique known to one having skill in the art. Using a Signatone station, the wafer temperature was varied from 24 to 65° C. (where x axis value in Kelvin=1000/(temp value° C.+273K)) to determine the temperature dependence of the sheet resistance of the $TiO_x$ layers 208.

Figure 3:
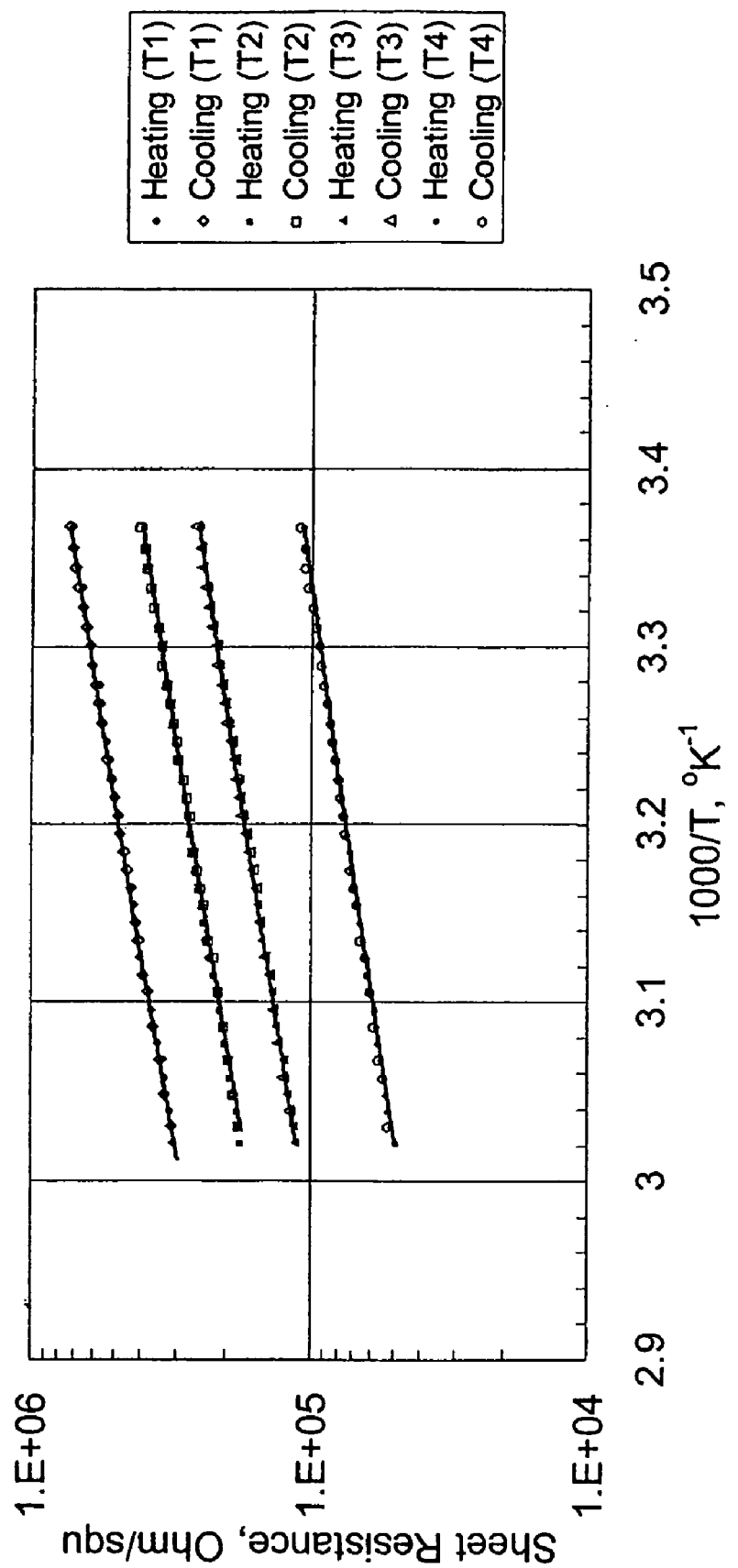
FIG. 3 is a graph depicting sheet resistance $R_{sr}$ versus the absolute temperature T for four different $TiO_x$ layers or films formed in accordance with the present invention.

FIG. 3 shows curves of sheet resistance $R_{st}$ versus the absolute temperature T for four of the different $TiO_x$ layers formed in accordance with the present invention. Although measurements of sheet resistance $R_{st}$ versus the absolute temperature T were obtained for each $TiO_x$ layer 208 produced have a different x value or corresponding resistance, measurements for only four of the TiOx layers 208 were graphed in FIG. 3 to avoid obscuring aspects of the invention. In FIG. 3, each solid data point corresponds to a measurement taken while the respective TiOx layer 208 was incrementally heated. The open data points graphed in FIG. 3 correspond to measurement taken at each degree decrease in temperature. As shown in FIG. 3, no hysteresis of the sheet resistance was found for each $TiO_x$ layer 208 and, from 24° to 65° C., the data reveals that $\ln[R_{st}(T)]$ increases linearly with 1/T for each $TiO_x$ layer 208. Further, the activation energy for each curve appears to be constant within this temperature range. In addition, the slope of each curve shown in FIG. 3 (i.e., the TCR value) increases with an increase in the sheet resistance (or x value concentration) of the $TiO_x$ layer 208 as further described below.

The performance of a bolometer is characterized by its TCR, which is defined in terms of the relative change in the electrical resistance R as shown in equation (1).

$$TCR = \frac{1}{R_{st}} \frac{dR_{st}}{dT} \quad (1)$$

Figure 4:
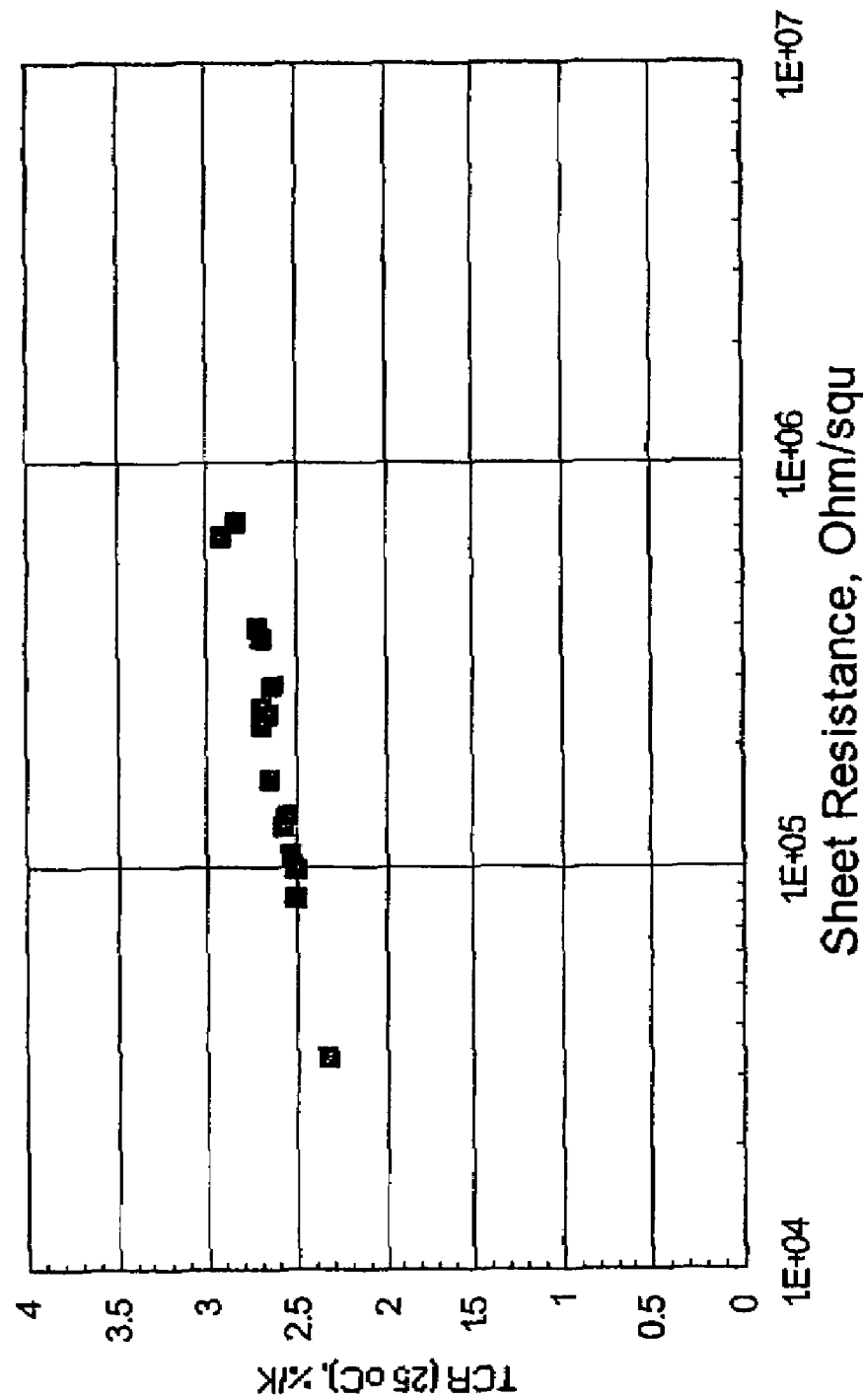
FIG. 4 is a graph depicting the dependence of TCR values on $R_{sr}$ or x concentration value for TiOx layers formed in accordance with the present invention, including each $TiO_x$ layer measured in FIG. 3.

The TCR values at room temperature were calculated from R (T) versus 1/T curves according to equation (1). The dependence of TCR values on $R_{st}$ for each TiOx layer 208 measured is depicted in FIG. 4. As shown in FIG. 4, the TCR value of a respective TiOx layer 208 increases with the sheet resistance or x concentration of the TiOx layer 208. The average TCR value measured at room temperature for the TiOx layers 208 was approximately 2.5% K−1, which is a typical value for commercial VOx bolometer materials.

Overall, the measured TCR values of TiOx layers (where the x value is in the range of 1.68 to 1.95) are comparable to those associated with the VOx material in an uncooled infrared focal plane array (e.g., array 102 of imager 100).

Figure 5B:
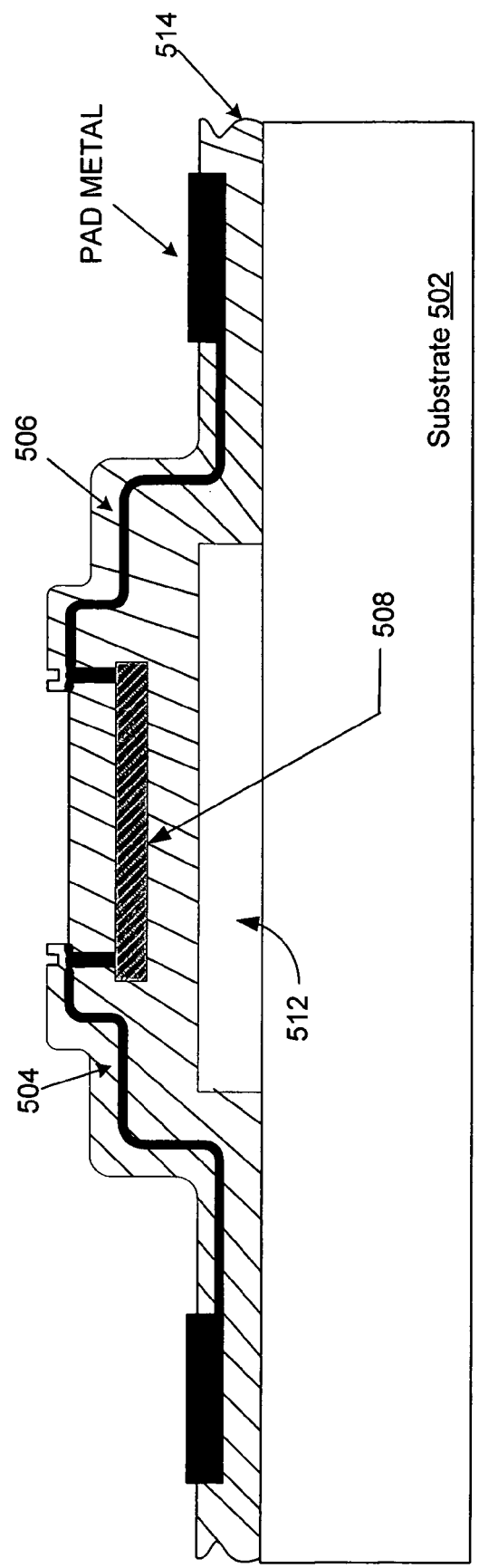
FIG. 5B depicts a cross-section of the two-terminal released bolometer in FIG. 5A.
Figure 6:
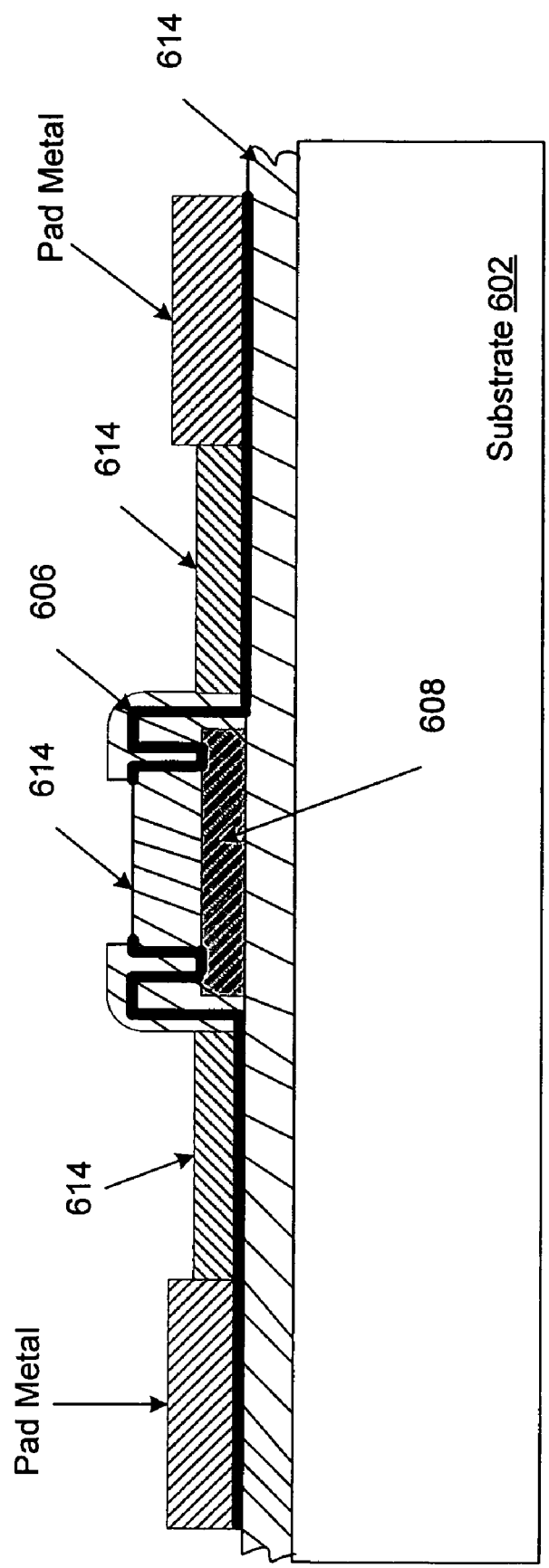
FIG. 6 depicts a cross-section of a two-terminal heat sink bolometer formed in accordance with the present invention.

The contact resistance between a metal leg 204 or 206 and a respective $TiO_x$ layer 208 formed in accordance with the present invention was measured using a plurality of two-terminal released bolometers 500 in FIGS. 5A-5B consistent with pixel bolometers 200a-200f without the umbrella 210 and a plurality of two-terminal heat sink bolometers 600 in FIG. 6 consistent with heat sink bolometers 122a-122z without the umbrella 210. Each of the released bolometers 500 and the heat-sink bolometers 600 were fabricated in accordance with the present invention using standard micromachining processs so that the TiOx layer 508 and 608 of each bolometer 500 and 600 has a different size ranging from one square to six squares on the same Si substrate. The TiOx layer 508 in the bolometer 500 depicted in FIG. 5 and the TiOx layer 608 in the bolometer 600 depicted in FIG. 6 each has a size of about one square in area. For each size of TiOx layer, the substrate included a heat sink bolometer 600 having a TiOx layer 608 fabricated directly on a $SiO_2$ coated 614 Si substrate 602, and a released type bolometer 500 fabricated on a sacrificial polyimide layer that was subsequently removed by dry etching to form the gap 512 between the respective TiOx layer and the $SiO_2$ layer.

Figure 7:
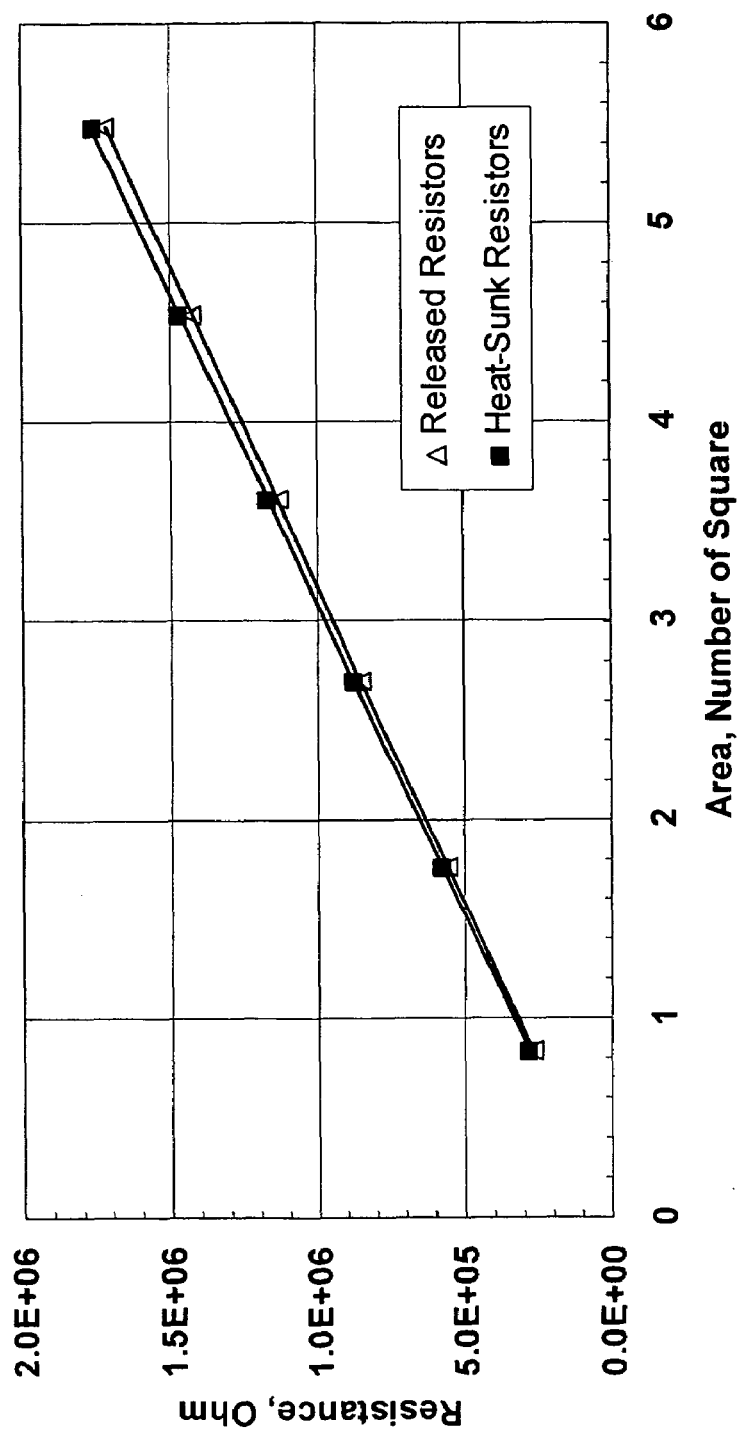
FIG. 7 is a graph depicting the relationship between the resistance of each two-terminal released pixel bolometer and each two-terminal heat sink bolometer at room temperature versus the area size of the each $TiO_x$ layer of each respective bolometer.

FIGS. 5A-5B and 6 depict two types of bolometers 500 and 600 selected for testing to confirm that the stress generated in $TiO_x$ resistor layers 508 and 608 from different fabrication processes would not affect the material properties of the TiOx layers 508 and 608 having an x value in the range of 1.68 to 1.95. Test results discussed below indicate that the TiOx layers 508 and 608 formed in accordance with the present invention have good ohmic contact with very low contact resistance. The ohmic nature of the contacts was confirmed by checking the linearity of the current-voltage curves for each $TiO_x$ layer 508 and 608. The contact resistance was measured by plotting the resistance versus the area size of the each $TiO_x$ layer 508 and 608 as shown in FIG. 7. Representative plots for the released resistors and the heat-sink resistors are shown in FIG. 7. The contact resistance, as determined from the linear curve fitting, is less than 1% of the sheet resistance of the respective $TiO_x$ layer 508 and 608. In addition, the difference in sheet resistance and contact resistance between the heat-sunk type and the released type bolometers 600 and 500, respectively, was found to be very small.

To measure 1/f noise in a $TiO_x$ layer of a bolometer formed in accordance with the present invention, four-terminal Wheatstone bridge structures 800 and 900 as shown in FIGS. 8 and 9 were fabricated adjacent to each other on the same substrate 802 and 902. The four-terminal Wheatstone bridge 800 in FIG. 8 includes four heat-sink bolometers consistent with the bolometers 122a-122z and 600. The four terminal Wheatstone bridge 900 in FIG. 9 includes four release bolometers consistent with the released bolometers 120a-120m and 500. Each of the four-terminal Wheatstone bridge structures 800 and 900 includes four equally sized $TiO_x$ resistive layers 808 and 908, where the sizes of the layers 808 and 908 in different bridges 800 and 900 vary and range from 6×6 to 50×50 μm². The actual dimensions of the $TiO_x$ resistive layers 808 and 908 can be measured using a scanning electron microscope, and each device die is preferably mounted on a 35-pin container after scribing.

Figure 10:
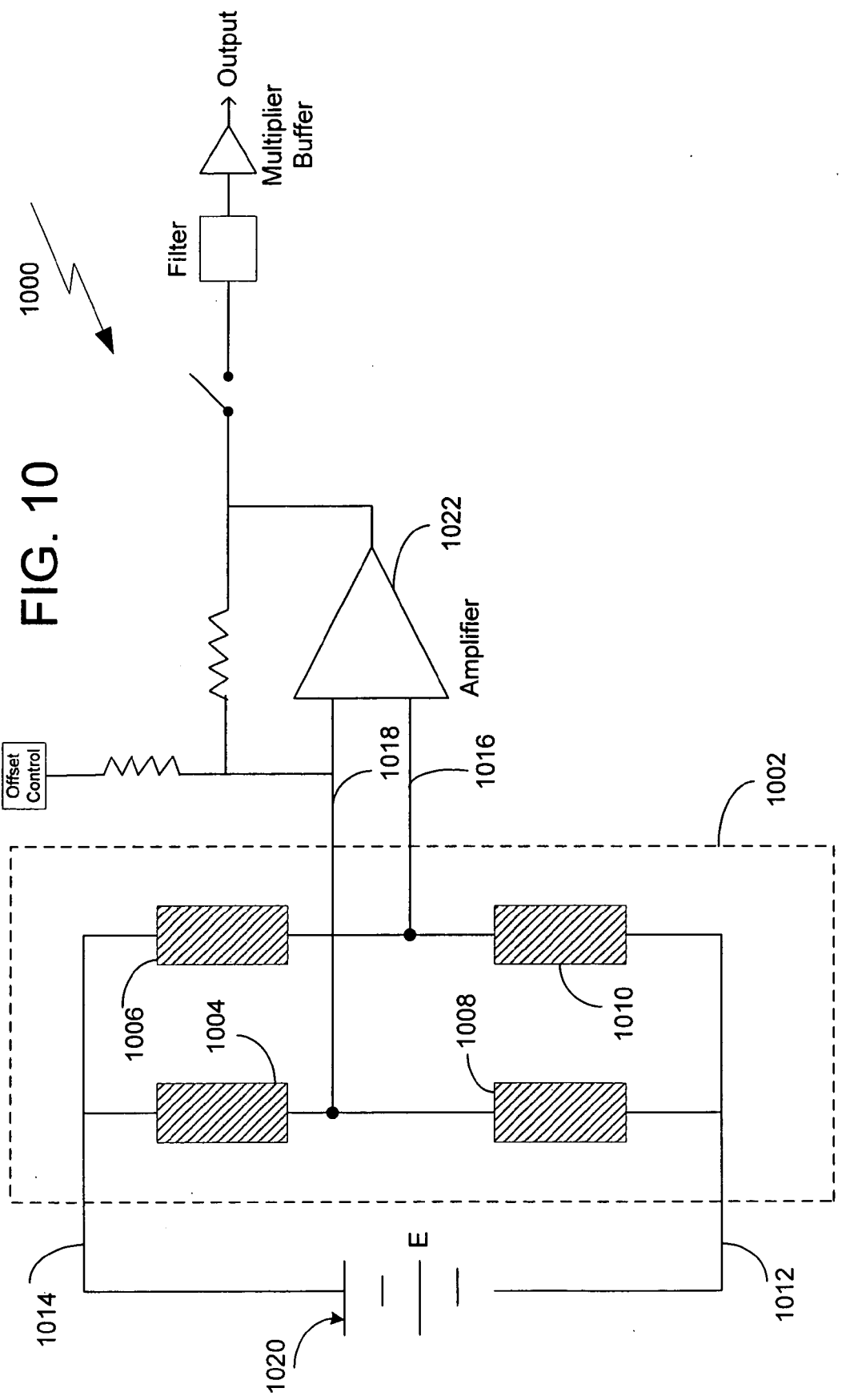
FIG. 10 depicts a schematic of an exemplary system for testing the four-terminal Wheatstone bridge shown in FIG. 8 or in FIG. 9.

FIG. 10 depicts a schematic of an exemplary system 1000 for testing a four-terminal Wheatstone bridge 1002 comprising four bolometers 1004, 1006, 1008, and 1010, such as the Wheatstone bridges 800 and 900 having four bolometers with respective $TiO_x$ resistive layers 808 and 809 as described above. The two input terminals 1012 and 1014 of the four terminals 1012, 1014, 1016, and 1018 of the Wheatstone bridge 1002 under test are connected to a battery 1020 and the two output terminals 1016 and 1018 of the Wheatstone bridge 1002 under test are connected to an amplifier 1022 for noise output measurements as shown in FIG. 10. Each of the bolometers 1004, 1006, 1008, and 1010 of the Wheatstone bridge 1002 under test are shielded (for example, in a metal box not shown in the figures) so the output of the amplifier 1022 corresponds substantially to 1/noise or black light sensing of a bolometer. Due to the balance of the bridge 1002, the noise of the battery 1020 is substantially eliminated. The system 1000 also prevents the DC current from flowing to the input of the amplifier. The noise measured from the system 1000 is the average noise of the four resistors (e.g., $TiO_x$ resistive layers 808 and 809) in the bolometers 1004, 1006, 1008, and 1010 of the Wheatstone bridge 1002 under test.

The 1/f-noise for a homogeneous resistor subjected to uniform fields is described by Hooge's known empirical relation. Assuming the bandwidth of interest equals 1, the spectral power density of the noise, $S_1$, is given by equation (2) below.

$$\frac{S_1}{I^2} = \frac{\alpha}{fN} \quad (2)$$

In equation (2), f is the frequency, N is the total number of free charge carriers, I is the DC current and α is a dimensionless noise parameter, referred to as the Hooge parameter. Although, in the testing, N values in each $TiO_x$ layer of each bolometer were not accurately measured, it is known that N is given by nV, where n is the carrier density and V is the volume of the resistor or $TiO_x$ layer. Therefore, equation (2) can be rewritten as shown in equation (3)

$$I_n^2 = \left(\frac{\alpha}{n}\right) \frac{I^2}{Vf} \quad (3)$$

where $I_n = S^{1/2}$ is the noise current spectral density. The material parameter, α/n, may be replaced with other variables. For example, Levinson and Snider as disclosed in the publication *IEEE Trans. Electron Devices* ED-33, 58 (1986) used a parameter B to replace a/n. For planar resistors with a uniform thickness t, Vandamme, et al in the publication *Appl. Phys.* 14, 205 (1977) used a parameter $C_{us}$ to replace α/n for a unit square area. The relation between a/n and the experimentally established noise parameters B, and $C_{us}$ is shown in equation (4)

$$B = \frac{\alpha}{n} = C_{us}t \quad (4)$$

A noise parameter K may be defined in accordance with equation (5) below.

$$K = \sqrt{\frac{\alpha}{n}} \quad (5)$$

Equation (3) then becomes $$I_n = \frac{KI}{\sqrt{fV}} \quad (6)$$

The noise parameter K obtained from 1/f-noise data according to equation (6) is independent of the sample volume for rectangular resistors with uniform carrier density.

As discussed above, multiple Wheatstone bridges 800 and 900 were formed on the same substrate 802 and 902 so that the bolometers 1004, 1006, 1008 and 1010 of a respective Wheatstone bridge 800 and 900 have different size than a neighboring Wheatstone bridge 800 and 900. Bolometers with various width and length, ranging from 6 μm to 50 μm were fabricated on the same substrate. The thickness of the TiO$_x$ layers 808 and 908 of Wheatstone bridges 800 and 900 range from 0.05 μm to 0.25 μm. The TiO$_x$ layers 808 and 908 of each Wheatstone bridge 800 and 900 was grown under the same conditions to maintain a constant carrier density n. The noise spectra for each bridge structure 800 and 900 was measured at several bias voltages to verify that the noise measured was indeed from the TiO$_x$ resistive layers 808 and 908. The noise currents or outputs from each bridge structure 800 and 900 were measured using an ITHACO Model 1211 trans-impendence amplifier. The signal output from the amplifier was sampled at 1 KHz, and then applied to the input of an FFT (fast Fourier transform) analyzer to generate noise current spectra. Each noise current spectrum density was constructed from 50,000 samples. Thirty spectra were taken and averaged to smooth the data. The high-frequency flat regions of the spectra were compared to the expected Johnson noise (further discussed below) to check the validity of the spectrum amplitude.

Figure 11:
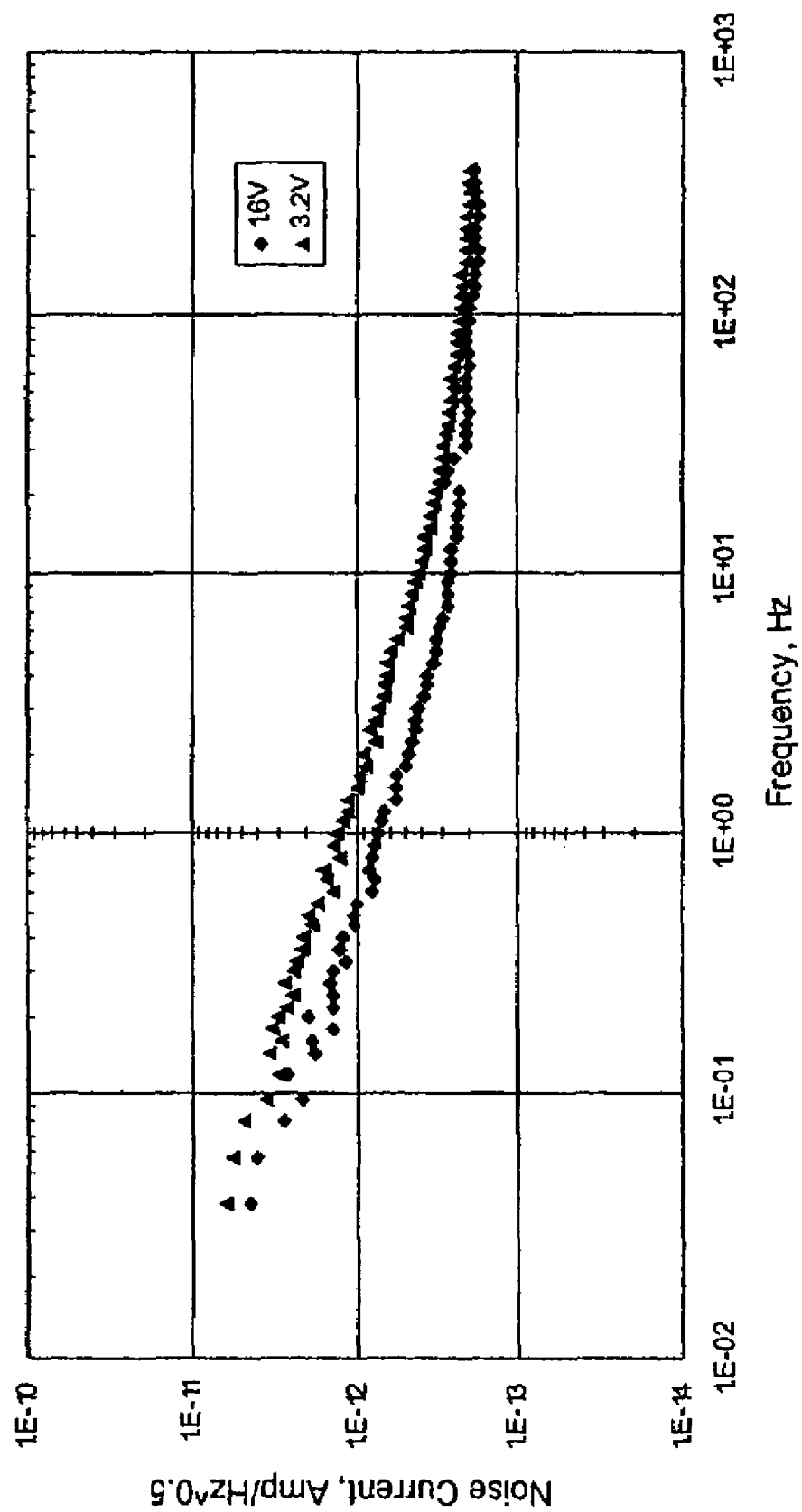
FIG. 11 is a graph depicting a noise spectrum for a four-terminal Wheatstone bridge having four bolometers formed in accordance with the present invention in which the Wheatstone bridge is biased at 1.6 and 3.2 volts.

FIG. 11 depicts the noise current spectra for one of the Wheatstone bridge structures 800 and 900 tested as described above in which the Wheatstone bridge was biased via the battery 1020 at 1.6 and 3.2 volts. The noise current spectra results shown in FIG. 11 are representative of each Wheatstone bridge structure 800 and 900 tested with a 1.6 and 3.2 volt bias. Both curves in FIG. 11 can be characterized by the combination of two types of noise: 1) a white noise at high frequency, and 2) a 1/f-noise at low frequency. The high frequency white noise is relatively independent of frequency and bias. This is a typical characteristic of thermal noise for a resistor (such as the TiOx layer of each bolometer in the Wheatstone bridge structures 800 and 900) that is caused by random motion of current carriers (called Johnson noise) and is represented by $I_{th} = \sqrt{4kT/R}$, where k, T, and R are Boltzmann's constant, the absolute temperature and the resistance of the ohmic resistor, respectively. The Johnson noise for the TiOx layer of each bolometer in the Wheatstone bridge structure 800 and 900 tested to derive the noise spectrum in FIG. 11 was calculated to be 2.13e–13 A/Hz$^{0.5}$, which is very close to the value of white noise measured at high frequency. At low frequency (f<10 Hz), there is excess current noise. The spectra in FIG. 11 shows a f$^{0.5}$ dependence on frequency. The magnitude increases with resistor bias, which is a typical characteristic of 1/f noise for resistors.

Figure 12:
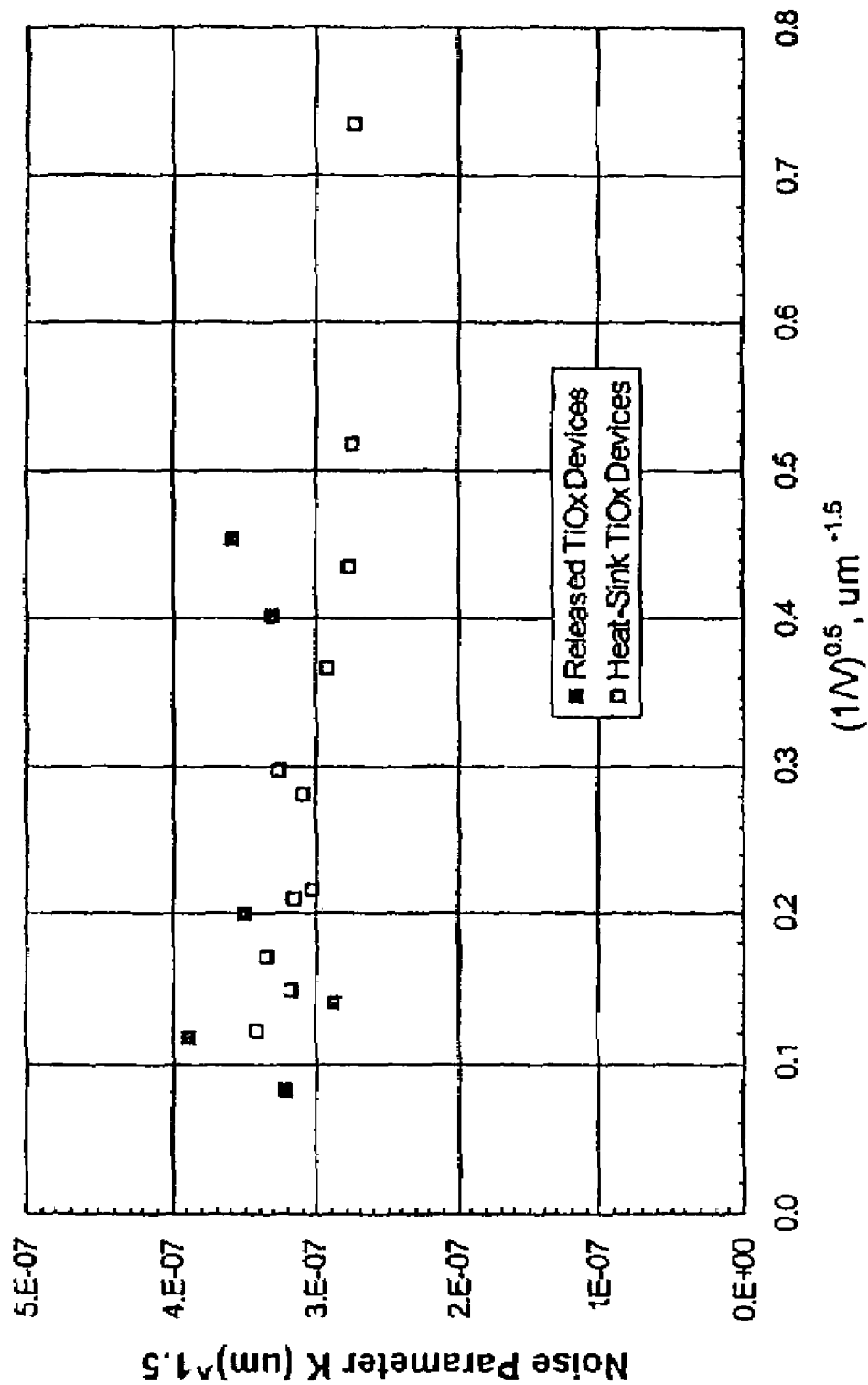
FIG. 12 is a graph depicting the noise parameter K for each bolometer having a $TiO_x$ resistive layer fabricated in accordance with the present invention as a function of the reciprocal of the square root of the volume for the TiOx resistive layer for the respective bolometer.

Values of the noise parameter K for each Wheatstone bridge 800 and 900 were obtained by the curve fitting of a power line to the excess noise data at low frequency and calculated according to Equation (6). FIG. 12 summarizes the results of the noise parameter K for each TiOx resistive layer (fabricated in accordance with the present invention) of the bolometer in the Wheatstone bridge 800 and 900. Referring to FIG. 12, the noise parameter K is, in general, independent of the bolometer volume, as expected from Equation (6). This indicates that the low frequency excess noise in each TiO$_x$ layer (where x is in the range of 1.68 to 1.95) is a material bulk phenomenon and can be described by Hooge's empirical formula. In addition, there is substantially no statistically significant difference observed between the K values from the released bolometers in the Wheatstone bridge 900 (each of which is consistent in structure to the released bolometer 500 in FIG. 5B) and from the heat-sink bolometers in the Wheatstone bridge 800 (each of which is consistent in structure to the heat-sink bolometer 600 in FIG. 6). The average K value obtained for each TiO$_x$ bolometer measured was 3.2e–7 (μm)$^{3/2}$. In comparison, based on the K values for VO$_x$ bolometer material used in conventional UFPAs, the average K value for a VO$_x$ material used as a resistive layer in a bolometer is roughly double the value for a bolometer having a TiO$_x$ layer formed in accordance with the present invention such that the x value is in the range of 1.68 to 1.95. Accordingly, the lower 1/f-noise for a bolometer having an amorphous TiO$_x$ layer (where x is in the range of 1.68 to 1.95) is more stable than a bolometer having a VO$_x$ layer as the resistive bolometer material.

Figure 13A:
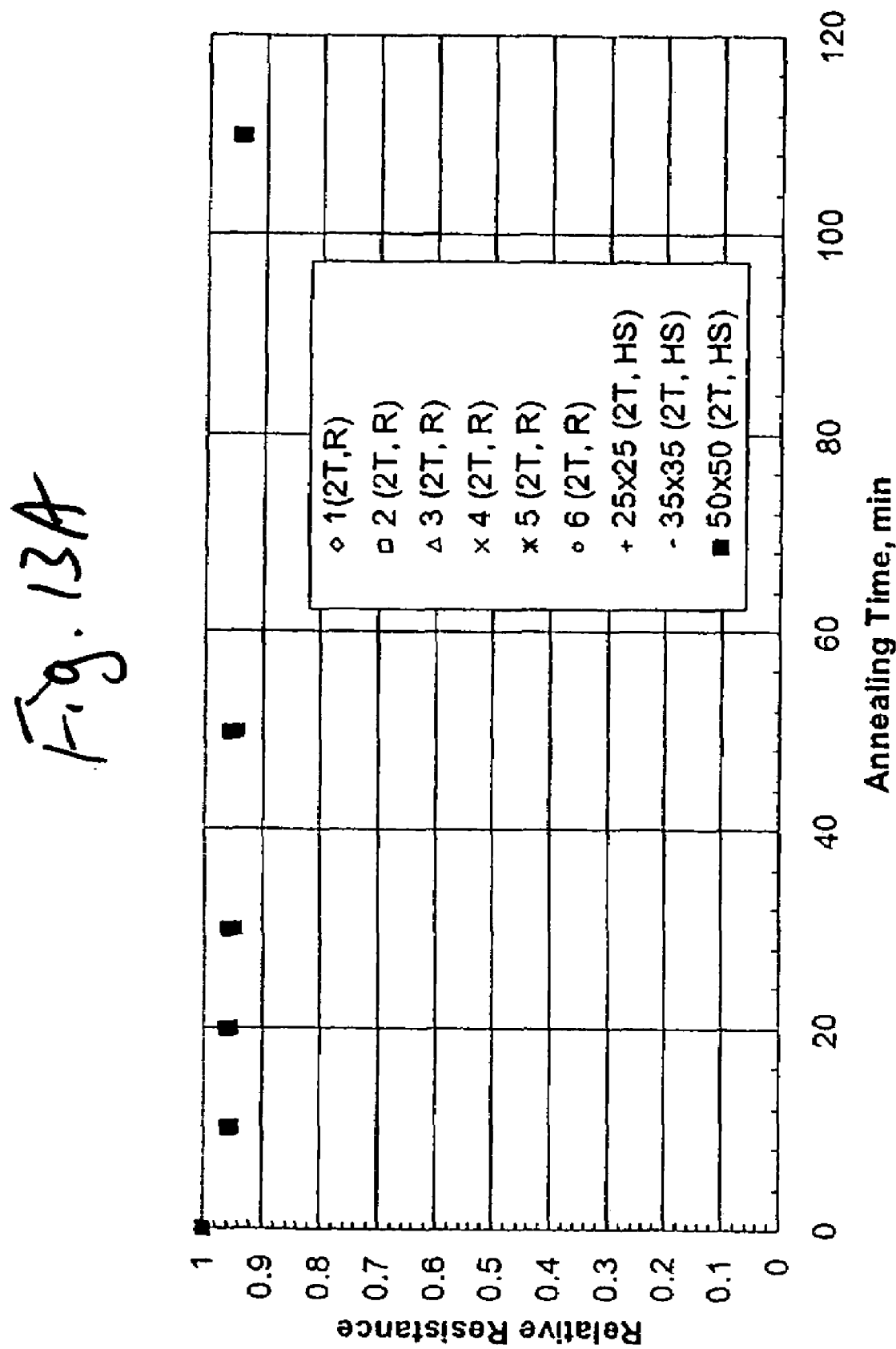
FIG. 13A is a graph depicting the effect of 310° C. annealing on the room temperature resistance for two-terminal released bolometers and two-terminal heat-sink bolometers each having a $TiO_x$ resistive layer formed in accordance with the present invention.
Figure 13B:
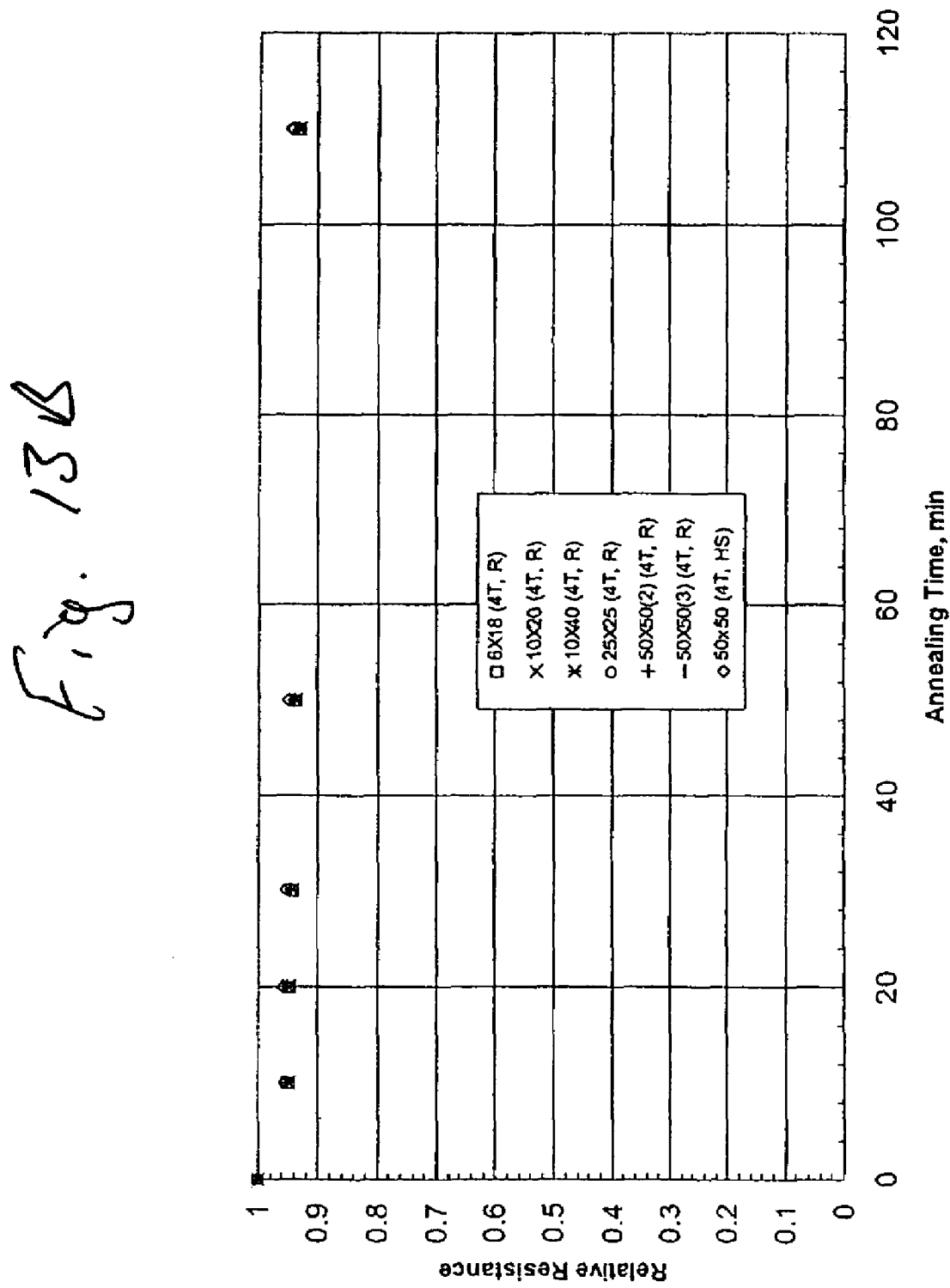
FIG. 13B is a graph depicting the effect of 310° C. annealing on the room temperature resistance for four-terminal Wheatstone bridges having either four released bolometers and or four heat-sink bolometers, each bolometer having a $TiO_x$ resistive layer formed in accordance with the present invention.

In addition, a bolometer having a TiO$_x$ layer formed in accordance with the present invention may be further improved to have substantially high resistance stability by heating the TiO$_x$ layer to at a predetermined temperature for a predetermined time. A plurality of released bolometers 500 and a plurality of heat-sink bolometers 600 (each having a TiO$_x$ layer formed in accordance with the present invenition) were each separated into a respective die and then annealed on a hot plate at 310° C. The resistance of each released bolometer 500 and heat-sink bolometer 600 on each die was measured before annealing. After 10 minutes of annealing, the dice were cooled down to room temperature and the resistance of each bolometer 500 and 600 was measured again. Additional annealing at 310° C. was done for the same bolometers 500 and 600 on the same dice, and the resistance measurements were repeated. FIG. 13A shows the effect of 310° C. annealing on the room temperature resistance for the released bolometers 500 (referenced as "2T, R" in FIG. 13A) and the heat-sink bolometers 600 (referenced as "2T, HS" in FIG. 13A). The corresponding results for 4-terminal Wheatstone bridges 800 and 900 are shown in FIG. 13B. As shown in FIGS. 13A and 13B, after an initial drop of 5% in the resistance for annealing 10 min. at 310° C., additional annealing at 310° C. for approximately 110 more minutes did not change the resistance of the TiO$_x$ layer in the respective bolometers 500, 600, 801a-801d, or 901a-901c. Similar results were observed when heating the TiO$_x$ layer 208 in the respective bolometers 500, 600, 801a-801d, or 901a-901d at 300° C. for 20 minutes, after which the resistance of the respective TiO$_x$ layer 208 was constant or substantially stable.

Figure 14A:
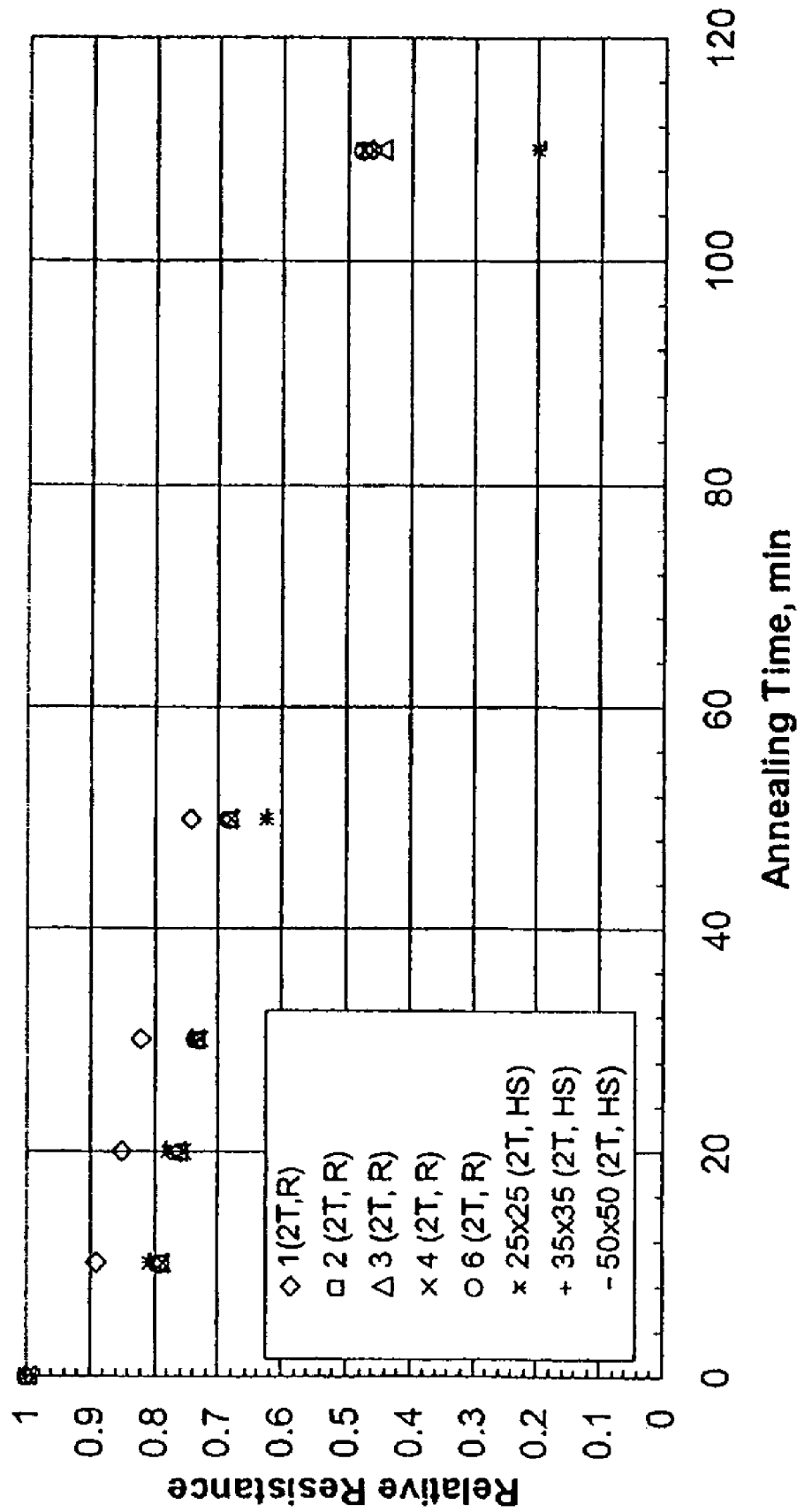
FIG. 14A is a graph depicting the effect of 310° C. annealing on the room temperature resistance for two-terminal released bolometers and two-terminal heat-sink bolometers each having a $VO_x$ resistive layer.
Figure 14B:
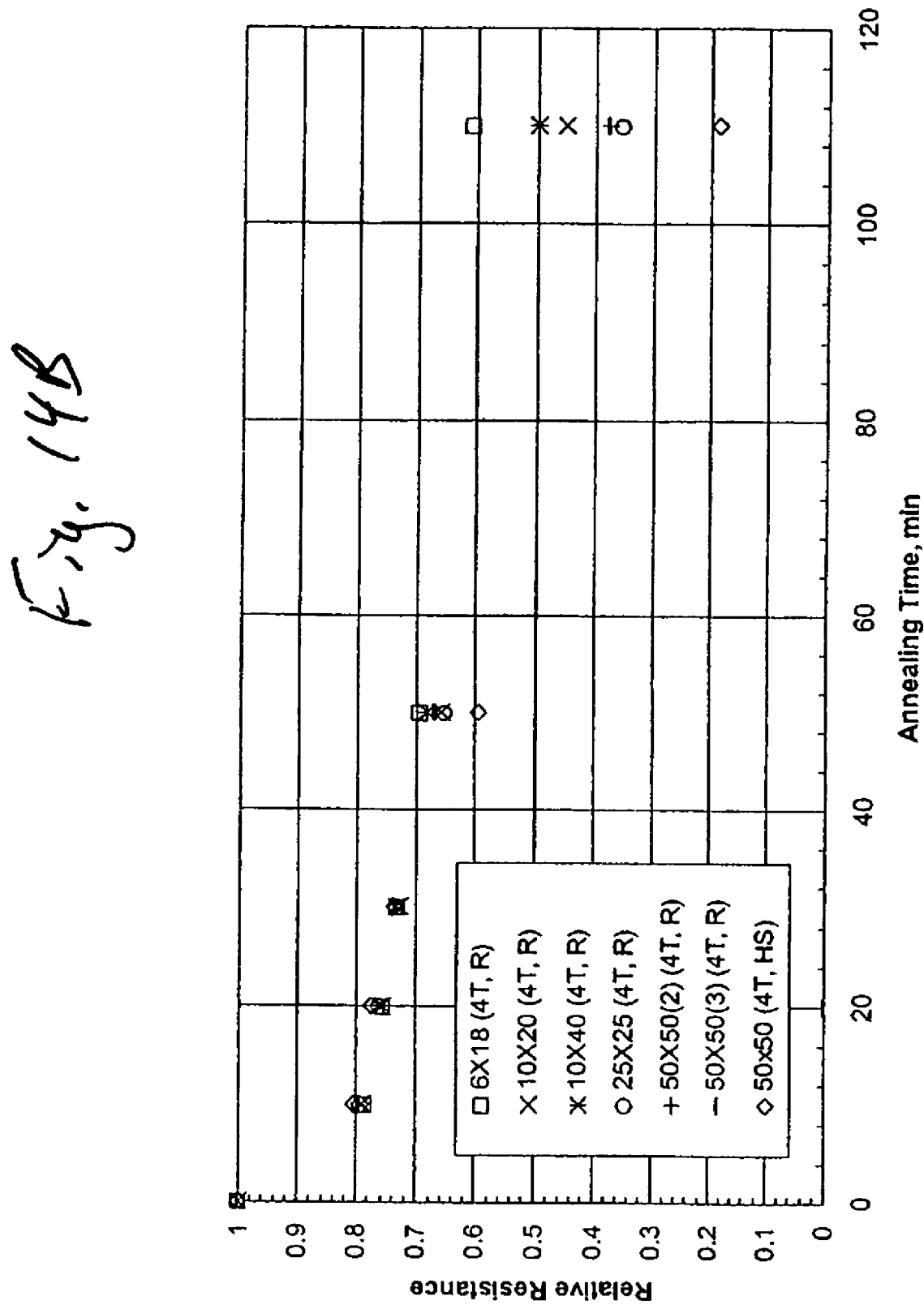
FIG. 14B is a graph depicting the effect of 310° C. annealing on the room temperature resistance for four-terminal Wheatstone bridges having either four released bolometers and or four heat-sink bolometers, each bolometer having a $VO_x$ resistive layer.

For comparison, the same annealing experiments were done on VO$_x$ bolometers. FIGS. 14A and 14B show the change of resistance as a function of annealing time for a plurality of 2-terminal VO$_x$ bolometers and four-terminal Wheatstone bridge structures having four VO$_x$ bolometers, respectively. The heating results depicted in FIGS. 14A and 14B for VO$_x$ bolometers are drastically different from the heating results depicted in FIGS. 13A and 13B for TiO$_x$ bolometers 500, 600, 801a-801d, or 901a-901d. As shown in FIGS. 14A and 14B, the resistance of each VO$_x$ bolometer degraded continuously with increasing anneal time. Annealing two-terminal VO$_x$ bolometers for 110 min at 310° C. caused a resistance drop to 20-50% of the original value for the respective two-terminal VO$_x$ bolometer as shown in FIG. 14A. Similar results were found for 4-terminal Wheatstone bridge structures having four VO$_x$ bolometers as shown in FIG. 14B.

Figure 15:
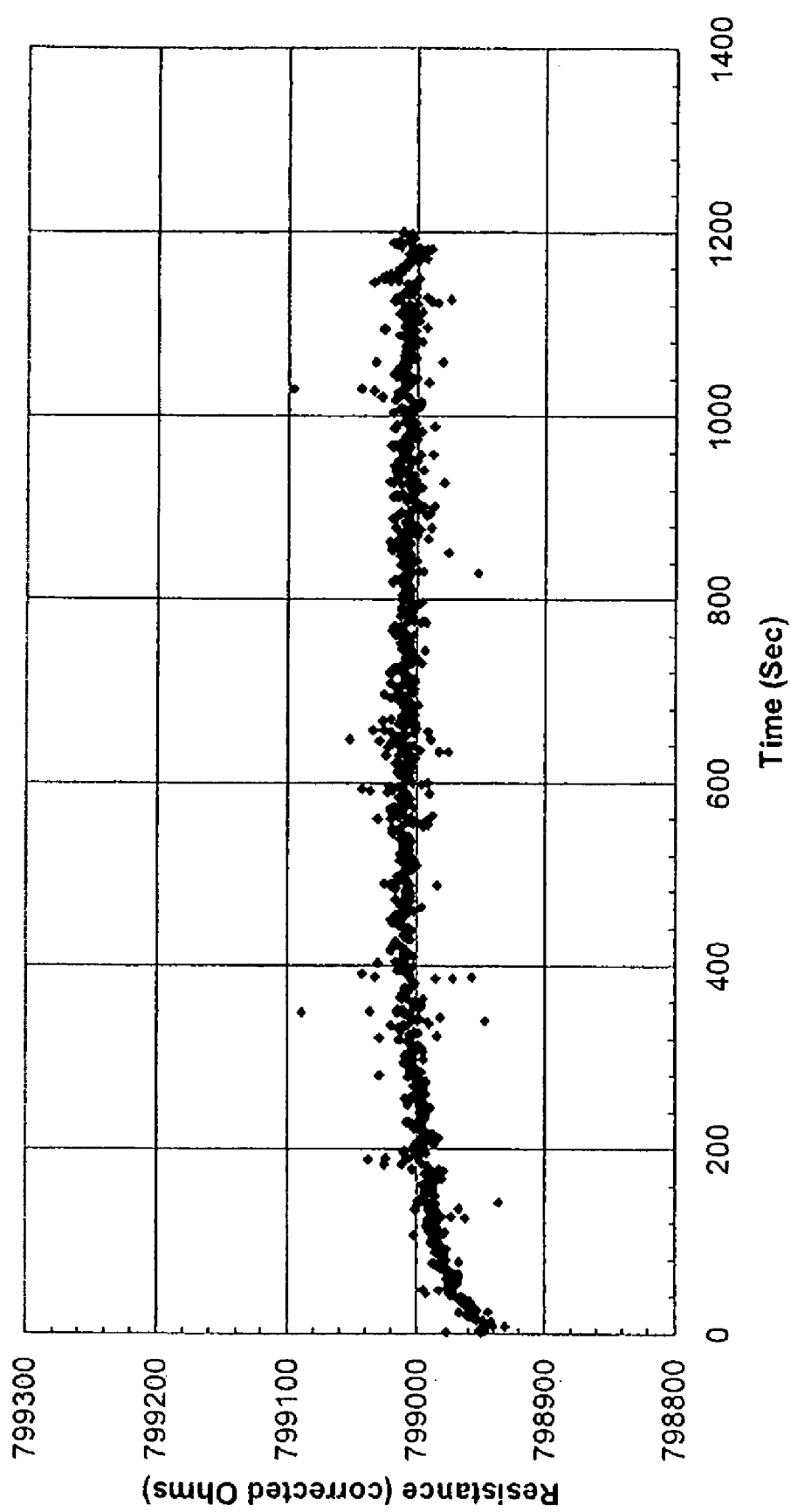
FIG. 15 is a graph depicting the time dependent resistance recovery or memory effect from 305° K/4 min. equivalent Joule heating for the $TiO_x$ layer of each bolometer in a focal plane array formed in accordance with the present invention.

To determine the effect heating has on the memory (e.g., resistance recovery) of a bolometer 200a-200n having a TiO$_x$ layer 208 formed in accordance with the present invention, the resistance recovery from separately heating a number of two-terminal bolometers 500 was recorded to see the resistance drift and memory effect in the TiO$_x$ layer 508. FIG. 15 shows the time dependent resistance recovery from 305° K/4 min (32° C./4 min). equivalent Joule heating for the TiO$_x$ layer of each bolometer 500 tested. As shown in FIG. 15, after heating at 305° K for 4 minutes, the resistance of each TiO$_x$ layer 508 recovered after 3 minutes and stayed substantially constant thereafter. Thus, a bolometer 500 comprising a TiO$_x$ layer 508 formed to have an x value in the range of 1.68 to 1.95 may have improved resistance stability with no memory effect problem when the bolometer 500 is first heated at 305° K. for 4 min.

Figure 16:
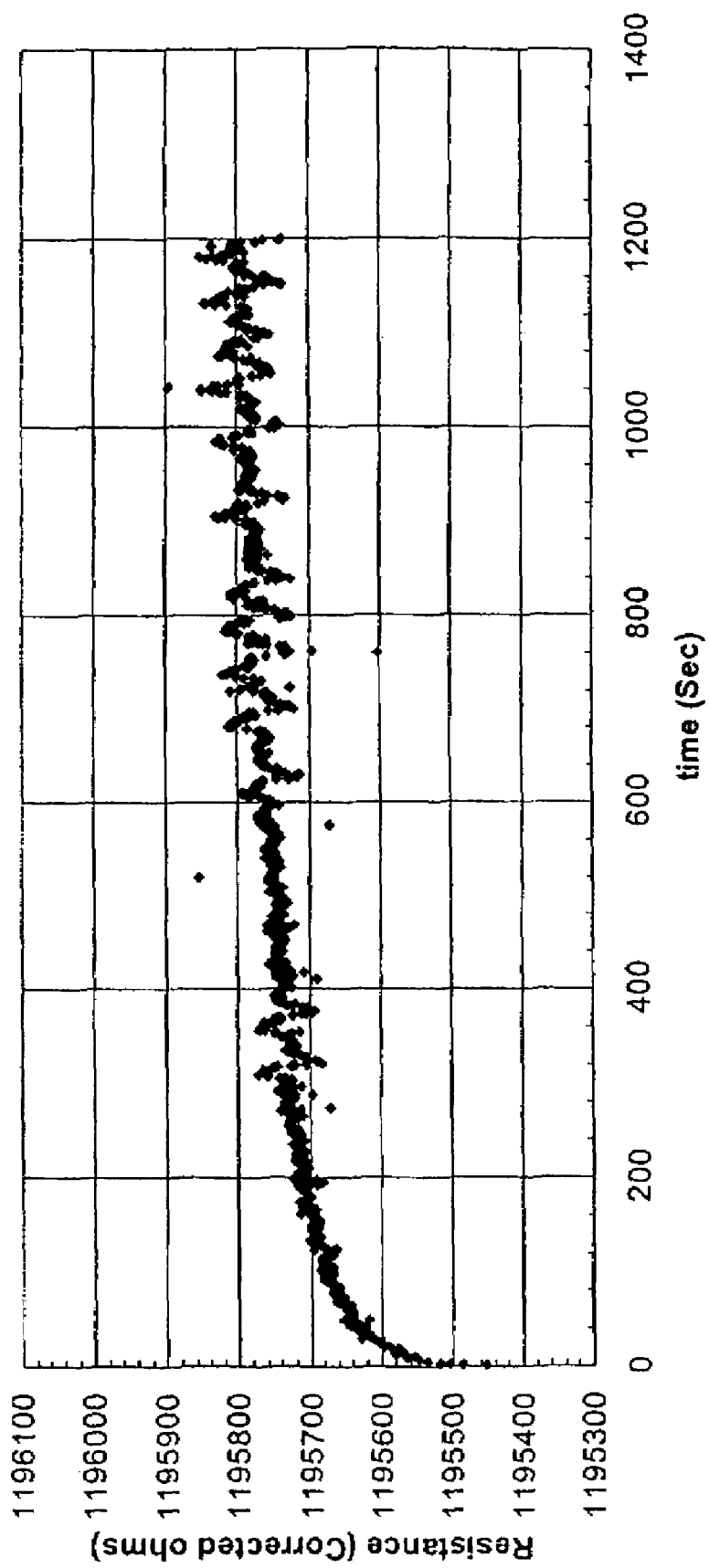
FIG. 16 is a graph depicting the time dependent resistance recovery from 305° K/4 min. equivalent Joule heating for each $VO_x$ bolometer in a focal plane array.

The same experiment was done for VO$_x$ bolometers. FIG. 16 depicts the time dependent resistance recovery from 305° K/4 min (32° C./4 min). equivalent Joule heating for VO$_x$ bolometer tested. As shown in FIG. 16, the resistance of the VO$_x$ bolometer has a long recovery time. The resistance continues to increase substantially during the entire 20 min recovery period. Such results clearly indicate that VO$_x$ bolometers exhibit the problem of resistance drift and memory effect after heating, whereas bolometers having TiO$_x$ resistive layers (where x is in the range of 1.68 to 1.95) have superior resistance stability.

Accordingly, bolometers 200a-200n having a TiO$_x$ resistive layer 208 in which the x value is in the range of 1.68 to 1.95 possess the following properties: (1) Adequate resistance value to match the readout circuitry of a respective pixel 104, 106, 108, 110, 112, or 114; (2) Substantially high TCR values (>2%); (3) Substantially low 1/f-noise, about 50% of the value for a VO$_x$ bolometer; (4) Good ohmic contact with low contact resistance between the TiO$_x$ layer 208 and the metal leg 204 or 206 of the respective bolometer 200a-200n; (5) Deposition techniques for the TiO$_x$ layer 208 are compatible with the process for fabricating monolithic UFPAs; and (5) Stable electrical properties, including resistance stability which may be substantially improved by heating the TiO$_x$ layer 208 at 200° C. for 1 hr or more or at 300° C. for 5 minutes or more, after which the resistance of the respective TiO$_x$ layer 208 remains constant or substantially stable.

Thus, the use of TiO$_x$ (where x is in the range of 1.68 to 1.95) as the bolometer material in an UFPA provides the following benefits: reduction in resistance drift; reduction in memory effect; higher operating temperature; lower 1/f noise, relaxation of the temperature constraint for fabrication and the package; elimination of the necessity for a contact metal layer, such as is required for VO$_x$ UFPAs; and simplification of calibration of an uncooled camera including an UFPA.

While various embodiments of the present invention have been described, it will be apparent to those of skill in the art that many more embodiments and implementations are possible that are within the scope of this invention. Accordingly, the present invention is not to be restricted except in light of the attached claims and their equivalents.

What is claimed is:

1. A bolometer for use in an infrared imager, comprising:
 a substrate; and
 a TiOx layer formed over the substrate, the TiOx layer having a resistance responsive to temperature, where x is in the range of 1.68 to 1.95,
 wherein the TiOx layer is heated at a predetermined temperature in a range of 300° C. to 420° C. for a predetermined period in a range of 5 to 20 minutes such that the TiOx layer has a substantially constant resistance stability.

* * * * *